US006654657B2

(12) United States Patent
Wang et al.

(10) Patent No.: US 6,654,657 B2
(45) Date of Patent: Nov. 25, 2003

(54) PROCESS OF MAKING A THREE-DIMENSIONAL PHOTOGRAPH

(76) Inventors: Tzuen-Yih Wang, 5F, No. 137, Chi-Lin Rd., Lu-Chu Hsiang, Tao-Yuan Hsien (TW); Leo Huang, 2F, No. 9-1, Ching-Tien St., Ta-An Dist., Taipei City (TW); Ming-Hsiong Chang, 12F, No. 92-2, Sung-Kao Rd., Hsin-I Dist., Taipei City (TW)

( * ) Notice: Subject to any disclaimer, the term of this patent is extended or adjusted under 35 U.S.C. 154(b) by 0 days.

(21) Appl. No.: 10/125,009

(22) Filed: Apr. 18, 2002

(65) Prior Publication Data

US 2003/0198757 A1 Oct. 23, 2003

(51) Int. Cl.[7] .................................... B32B 27/14
(52) U.S. Cl. .................... 700/119; 700/118; 156/60
(58) Field of Search .................... 700/98, 118–120, 700/161, 163, 166; 156/58–60, 196, 242, 443, 553, 580, 581

(56) References Cited

U.S. PATENT DOCUMENTS

| | | | | | |
|---|---|---|---|---|---|
| 5,122,441 | A | * | 6/1992 | Lawton et al. | 430/320 |
| 5,363,159 | A | | 11/1994 | Melvin | 354/76 |
| 5,807,448 | A | * | 9/1998 | Nakazawa | 156/58 |
| 6,506,477 | B1 | * | 1/2003 | Ueda et al. | 428/195 |

OTHER PUBLICATIONS

Fabrice Neyret, "Modeling, Animating, and Rendering Complex Scenes Using Volumetric Textures" Jan.–Mar. 1998, IEEE Transactions On Visualization and Computer Graphics, vol. 4, No. 1.*

* cited by examiner

*Primary Examiner*—Jayprakash N. Gandhi
*Assistant Examiner*—Sean Shechtman
(74) *Attorney, Agent, or Firm*—Ohlandt, Greeley, Ruggiero & Perle, L.L.P.

(57) ABSTRACT

A process for manufacturing a three-dimensional photograph includes:

establishing a three-dimensional coordinate system and subsequently generating a three-dimensional spatial image within the coordinate system;

dividing the image into a plurality of pixels and subsequently storing spatial data and color data of the pixels in a memory;

dividing the image into a plurality of image layers along a direction corresponding to a coordinate of the coordinate system;

providing a plurality of transparent plates and coloring a side surface of each of the plates at positions corresponding to the pixels in a respective one of the image layers, based on the spatial data and the color data in the memory; and combining the transparent plates, thereby forming the photograph.

2 Claims, 5 Drawing Sheets

PROCESS OF MAKING A THREE-DIMENSIONAL PHOTOGRAPH

BACKGROUND OF THE INVENTION

1. Field of the Invention

This invention relates to a three-dimensional photograph and a process for manufacturing the same.

2. Description of the Related Art

The improvement of this invention is directed to a conventional three-dimensional photograph disclosed in U.S. Pat. No. 5,363,159. A process for manufacturing the conventional three-dimensional photograph includes generating spatial and color data relating to an outside surface of a three-dimensional surface, such as a human subject, forming a mold having a concave surface corresponding to the outside surface of the subject, molding a hollow transparent plastic shell in the mold, applying a photographic material on an inside surface of the shell, and exposing the photographic material to provide a colored image on the photographic material for display through the transparent material of the shell. It is difficult to make the mold during this process, thereby resulting in high costs for making the conventional three-dimensional photograph. Moreover, the aforesaid conventional three-dimensional photograph is unlifelike.

SUMMARY OF THE INVENTION

An object of this invention is to provide a three-dimensional photograph which is inexpensive to make.

Another object of this invention is to provide a process for manufacturing a three-dimensional photograph, which does not require a mold-forming step, thereby resulting in lower manufacturing costs.

Still another object of this invention is to provide a lifelike three-dimensional photograph.

According to one aspect of this invention, a process for manufacturing a three-dimensional photograph includes:

- establishing a three-dimensional coordinate system and subsequently generating a three-dimensional spatial image within the coordinate system;
- dividing the image into a plurality of pixels and subsequently storing spatial data and color data of the pixels in a memory;
- dividing the image into a plurality of image layers along a direction corresponding to a coordinate of the coordinate system;
- providing a plurality of transparent plates and coloring a side surface of each of the plates at positions corresponding to the pixels in a respective one of the image layers, based on the spatial data and the color data in the memory; and
- combining the transparent plates, thereby forming the photograph.

Preferably, each adjacent pair of the transparent plates are interconnected by means of a transparent adhesive layer which is made of a material that has a refractive index the same as that of the transparent plates, and an assembly of the combined transparent plates is coated with a transparent protective layer.

According to another aspect of this invention, a three-dimensional photograph includes a plurality of combined transparent plates. Each of the transparent plates has a first side surface and a second side surface. The first side surface of one of each adjacent pair of the transparent plates abuts against the second side surface of the other of the pair of the transparent plates. The first side surfaces of the transparent plates are colored so as to form a three-dimensional image.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
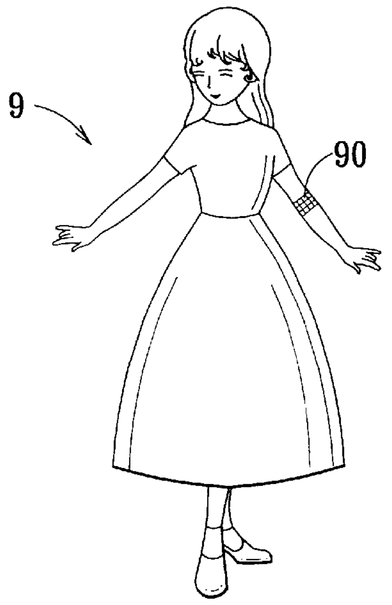
FIG. 1 illustrates how a spatial image of a person is divided into a plurality of pixels in a computer during a process for manufacturing a first preferred embodiment of a three-dimensional photograph according to this invention.
Figure 2:
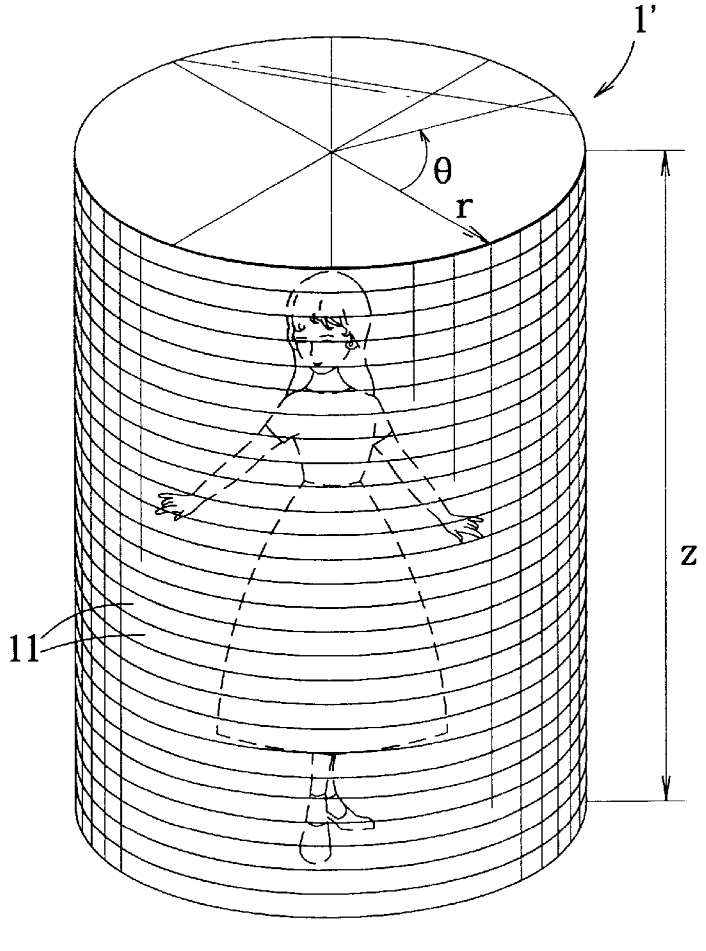
FIG. 2 illustrates how the spatial image is divided into a plurality of layers along a Z-axis of a first three-dimensional coordinate system that has three coordinates (r, θ, z) during the manufacturing process of the first preferred embodiment.
Figure 3:
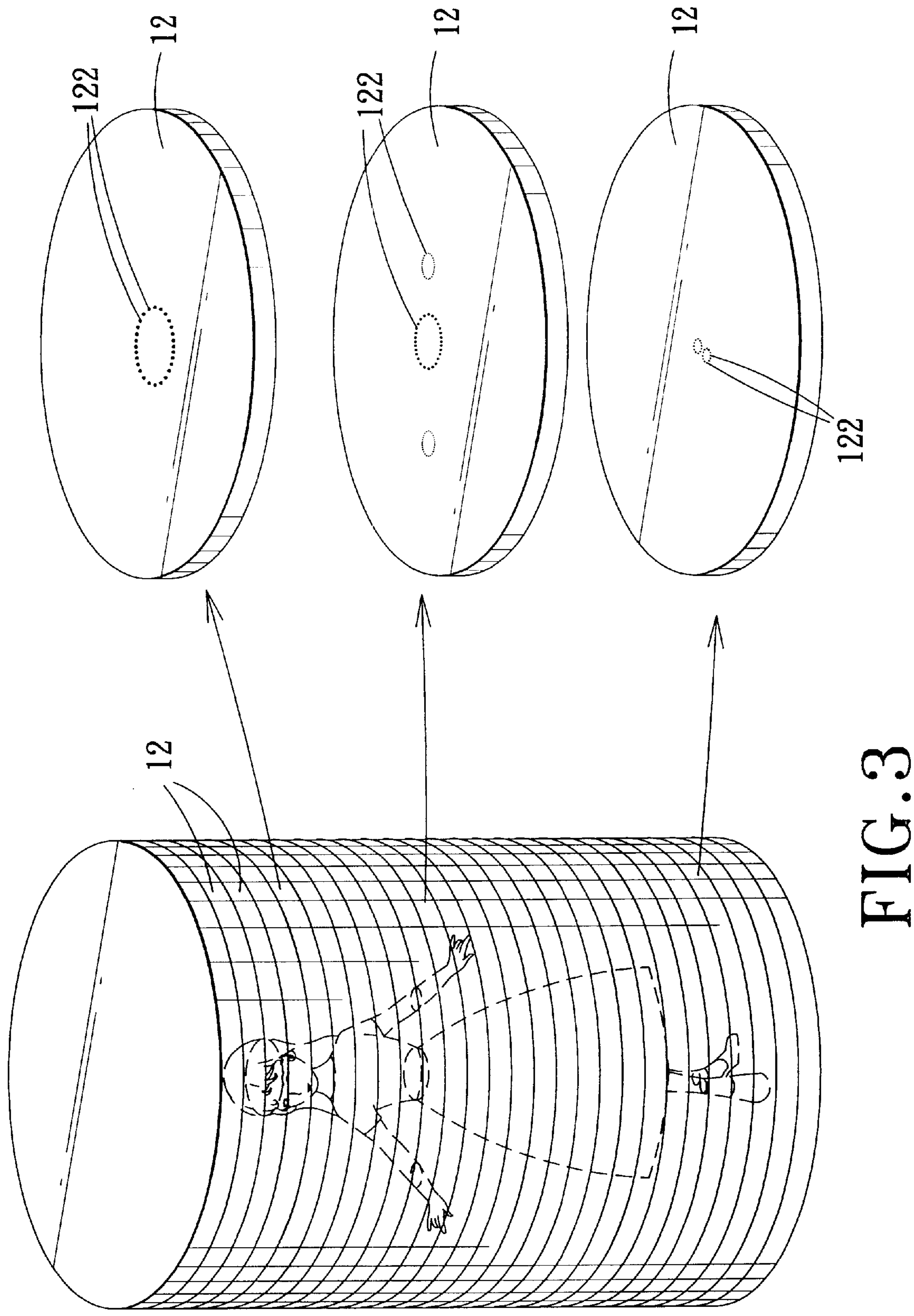
FIG. 3 illustrates how a plurality of semi-spherical cavities are formed in a top surface of each of a vertical stack of overlapped transparent plates during the manufacturing process of the first preferred embodiment.

Referring to FIGS. 1, 2, 3, and 4, a process for manufacturing a first preferred embodiment of a cylindrical three-dimensional photograph 1 according to this invention includes the following steps:

(1) establishing a first three-dimensional coordinate system 1' and subsequently generating a three-dimensional spatial image 9 within the coordinate system 1' by a known three-dimensional photographic technique, as shown in FIGS. 1 and 2;

(2) dividing the image 9 into a plurality of pixels 90 and subsequently storing spatial data and color data of the pixels 90 in a memory, as shown in FIG. 1;

(3) dividing the image into a plurality of image layers 11 along a direction corresponding to a coordinate of the coordinate system 1', the layers 11 having uniform thickness, as shown in FIG. 2;

(4) providing a plurality of circular transparent plates 12 of uniform thickness, each of which has a flat first side surface or top surface and a flat second side surface or bottom surface, and coloring the top surface of each of the plates 12 at positions 122 corresponding to the pixels 90 in a respective one of the image layers 11, based on the spatial data and the color data in the memory, as shown in FIG. 3; and (5) combining the transparent plates 12 such that the top surface of one of each adjacent pair of the plates 12 abuts against the bottom surface of the other of the pair of the plates 12, thereby forming the photograph 1, as shown in FIG. 3.

In order to color the transparent plates 12, a plurality of semi-spherical cavities can be formed at the positions 122 in the top surfaces of the transparent plates 12 by laser beams emitted onto the top surfaces so as to be filled with colorings, based on the color data in the memory. Each of the semi-spherical cavities has a depth that depends on chrominance of a respective one of the pixels 90. Alternatively, the top surfaces of the transparent plates 12 can be colored by a printer that is connected electrically to a computer, in which the memory is disposed.

In case the semi-spherical cavities are formed at the positions 122 in the top surfaces of the transparent plates 12, each of the bottom surfaces of the transparent plates 12 can also be formed with a plurality of semi-spherical cavities at positions corresponding to the positions 122 such that a plurality of spherical sealed chambers are defined between each adjacent pair of the transparent plates 12, thereby permitting colorings to be filled into the sealed chambers.

Figure 4:
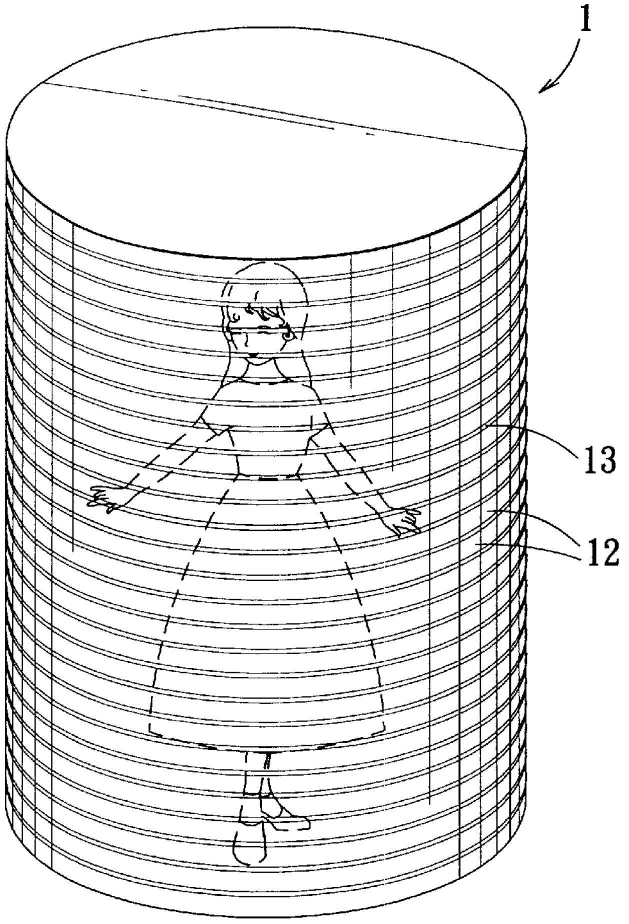
FIG. 4 illustrates how each adjacent pair of the transparent plates are interconnected by a transparent adhesive layer during the manufacturing process of the first preferred embodiment.
Figure 4A:
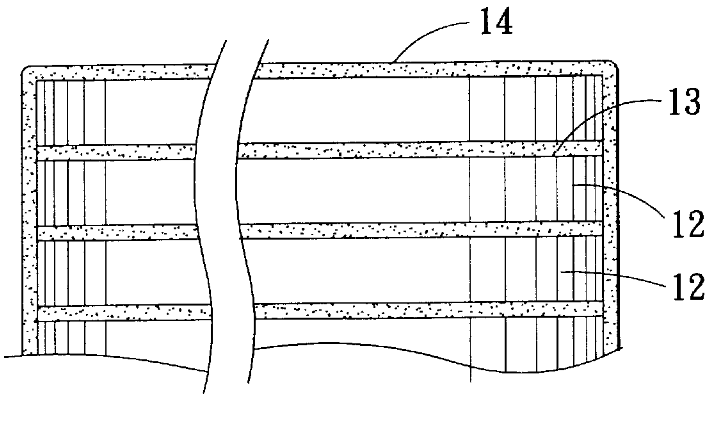
FIG. 4A is a fragmentary sectional view of the first preferred embodiment.

In the coordinate system 1', each pixel 90 has three coordinates (r, θ, z). The image 9 is divided into the layers 11 along a Z-axis of the coordinate system 1'. The step (5) includes the substeps of superposing the transparent plates 12 along the Z-axis of the coordinate system 1', and interconnecting each adjacent pair of the transparent plates 12 by means of a transparent adhesive layer 13 which is made of a material that has a refractive index the same as that of the transparent plates 12, as shown in FIGS. 3 and 4. Preferably, the superposed assembly of the transparent plates 12 includes a non-colored uppermost transparent plate 12 and a non-colored lowermost transparent plate 12, and is coated with a transparent protective layer 14 (see FIG. 4A) which is made of a material that has a refractive index the same as that of the transparent plates 12.

Figure 5:
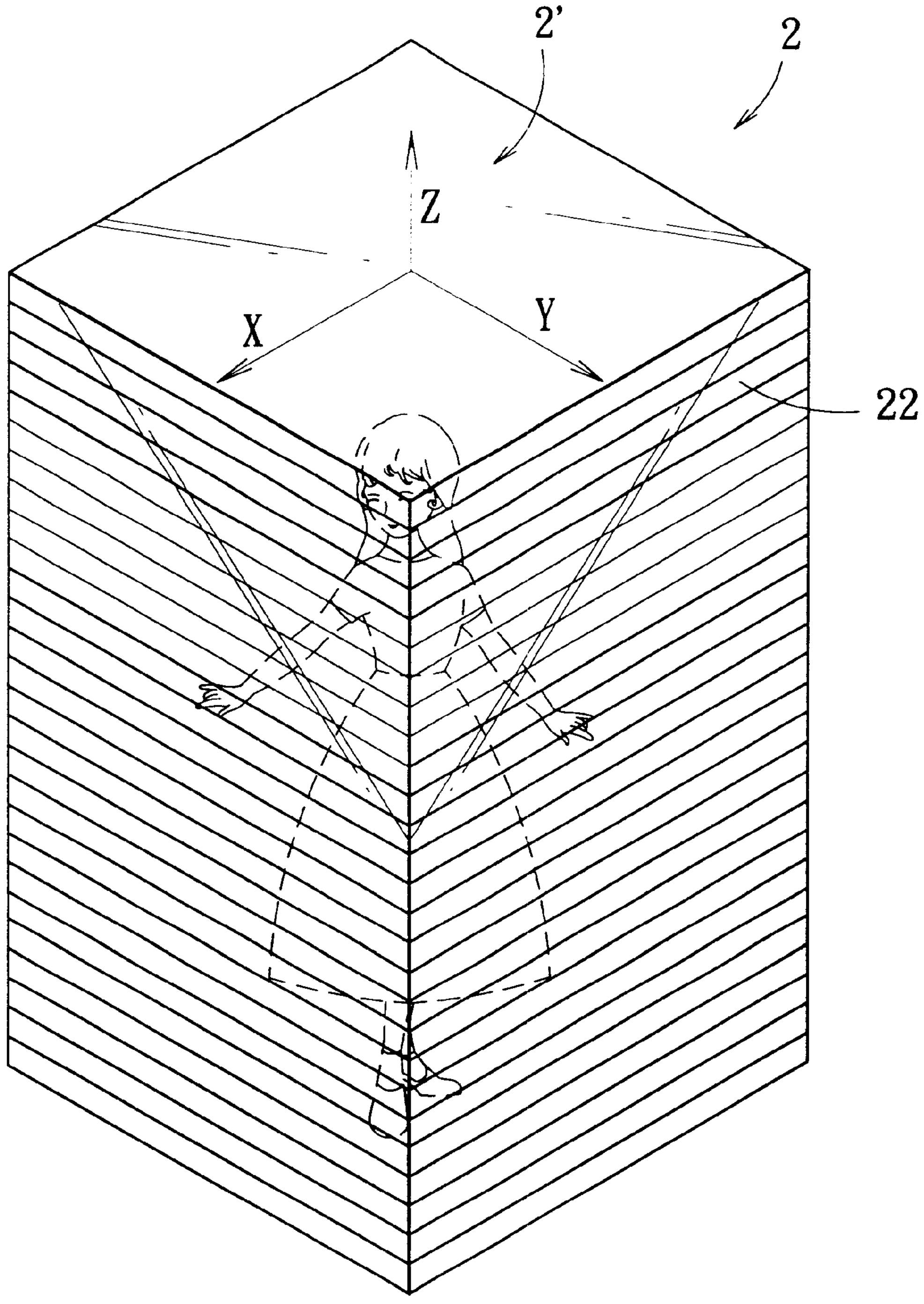
FIG. 5 illustrates how a spatial image is divided into a plurality of layers along a Z-axis of a second three-dimensional coordinate system that has three axes (X, Y, Z) during the manufacturing process of a second preferred embodiment of a three-dimensional photograph according to this invention.

FIG. 5 shows a second preferred embodiment of a three-dimensional photograph 2 according to this invention, which is shaped as a rectangular prism and which is similar to that shown in FIG. 3 in construction, except that the transparent plates 22 are rectangular. Preferably, a second three-dimensional coordinate system 2', which has X, Y, and Z axes, is used instead of the first three-dimensional coordinate system 1' (see FIG. 2).

Figure 6:
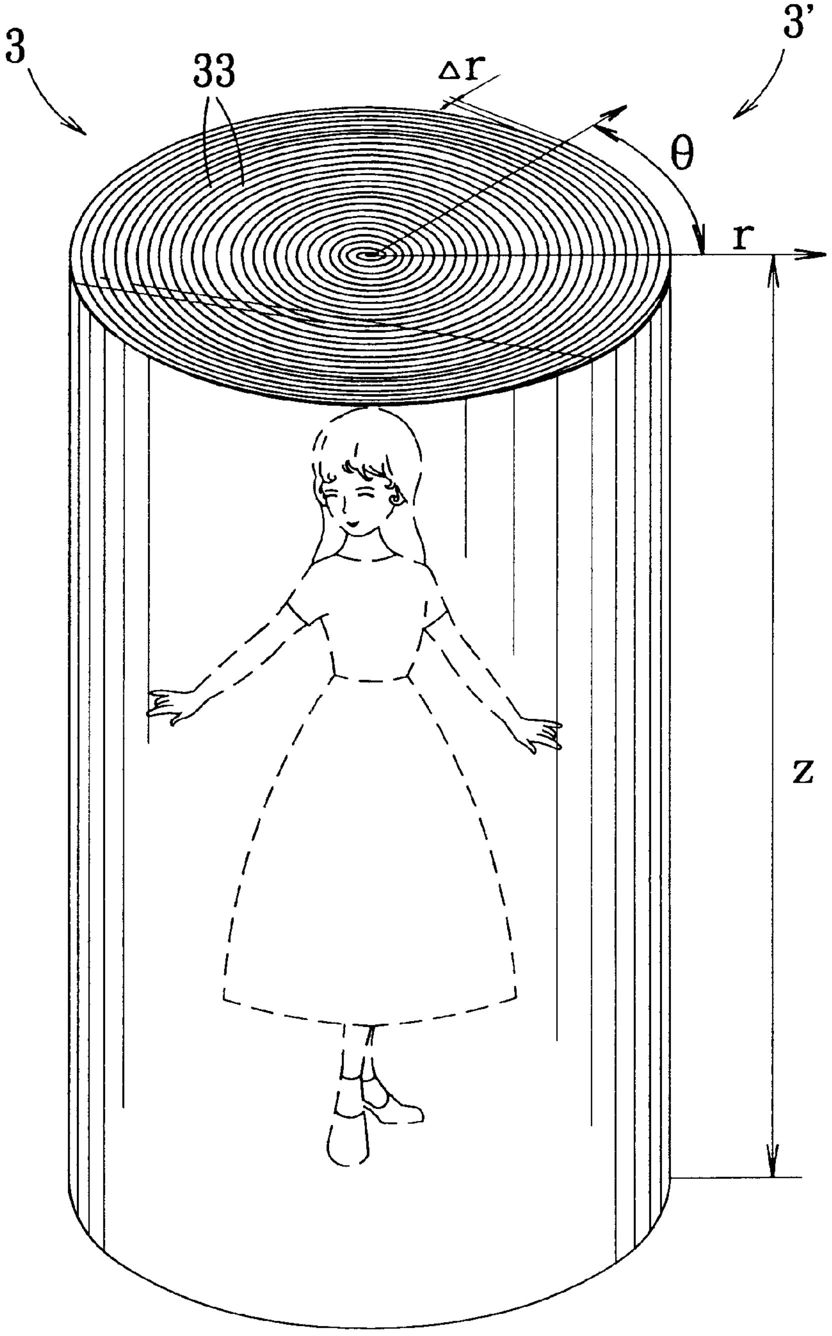
FIG. 6 illustrates how a spatial image is divided into a plurality of layers along a radial direction of a third three-dimensional coordinate system that has three coordinates (r, θ, z) during the manufacturing process of a third preferred embodiment of a three-dimensional photograph according to this invention.

FIG. 6 shows a third preferred embodiment of a three-dimensional photograph 3 according to this invention. Unlike the previous embodiments, the transparent plates 33 are flexible, and are formed integrally and extend along a spiral path so as to form a roll of film, which has a colored inner surface and a non-colored outer surface. Each adjacent pair of the transparent plates 33 are rectangular, and respectively have two adjacent sides that are formed integrally with each other. As such, the plates 33 are combined when the roll of film is formed. During a process for manufacturing the third preferred embodiment, a three-dimensional spatial image is divided into a plurality of layers along a radial direction of a third three-dimensional coordinate system 3', in which each pixel has three coordinates (r, θ, z). The transparent plates 33 have uniform thickness Δr.

With this invention thus explained, it is apparent that numerous modifications and variations can be made without departing from the scope and spirit of this invention. It is therefore intended that this invention be limited only as indicated by the appended claims.

We claim:

1. A process for manufacturing a three-dimensional photograph comprising the steps of:

(1) establishing a three-dimensional coordinate system and subsequently generating a three-dimensional spatial image within said coordinate system;

(2) dividing said image into a plurality of pixels and subsequently storing spatial data and color data of said pixels in a memory;

(3) dividing said image into a plurality of image layers along a direction corresponding to a coordinate of said coordinate system;

(4) providing a plurality of transparent plates and coloring a side surface of each of said plates at positions corresponding to said pixels in a respective one of said image layers, based on said spatial data and said color data in said memory, by emitting laser beams onto said side surfaces so as to form semi-spherical cavities at said positions and fitting colorings into said cavities, based on said color data in said memory, wherein depths of said semi-spherical cavities depend on chrominances of said pixels; and (5) combining said transparent plates, thereby forming said photograph.

2. A process for manufacturing a three-dimensional photograph comprising the steps of:

(1) establishing a three-dimensional coordinate system and subsequently generating a three-dimensional spatial image within said coordinate system;

(2) dividing said image into a plurality of pixels and subsequently storing spatial data and color data of said pixels in a memory;

(3) dividing said image into a plurality of image layers along a direction corresponding to a coordinate of said coordinate system, comprising the step of dividing said image into said image layers along a Z-axis of said coordinate system;

(4) providing a plurality of transparent plates and coloring a side surface of each of said plates at positions corresponding to said pixels in a respective one of said image layers, based on said spatial data and said color data in said memory; and (5) combining said transparent plates, thereby forming said photograph comprising the steps of superposing said transparent plates along said Z-axis of said coordinate system and interconnecting each adjacent pair of said transparent plates by means of a transparent adhesive layer which is made of a material that has a refractive index approximate to that of said transparent plates.

* * * * *